US012753561B2

(12) United States Patent
Freeman

(10) Patent No.: US 12,753,561 B2
(45) Date of Patent: Oct. 6, 2026

(54) STRUCTURED SEAWALL FOR PROMOTING BIODIVERSITY THEREON

(71) Applicant: MIGHTY SEAWALL INC., Miami, FL (US)

(72) Inventor: Anya Freeman, Miami Beach, FL (US)

(73) Assignee: MIGHTY SEAWALL INC., Miami, FL (US)

(*) Notice: Subject to any disclaimer, the term of this patent is extended or adjusted under 35 U.S.C. 154(b) by 35 days.

(21) Appl. No.: 18/878,689

(22) PCT Filed: Jun. 22, 2023

(86) PCT No.: PCT/US2023/025917
§ 371 (c)(1),
(2) Date: Dec. 24, 2024

(87) PCT Pub. No.: WO2024/006131
PCT Pub. Date: Jan. 4, 2024

(65) Prior Publication Data

US 2025/0382759 A1 Dec. 18, 2025

Related U.S. Application Data

(60) Provisional application No. 63/403,960, filed on Sep. 6, 2022, provisional application No. 63/356,648, filed on Jun. 29, 2022.

(51) Int. Cl.

| | |
|---|---|
| ***E02B 3/06*** | (2006.01) |
| ***B28B 1/00*** | (2006.01) |
| ***B33Y 10/00*** | (2015.01) |
| ***B33Y 50/00*** | (2015.01) |

(52) U.S. Cl.
CPC ................ *E02B 3/06* (2013.01); *B28B 1/001* (2013.01); *B33Y 10/00* (2014.12); *B33Y 50/00* (2014.12); *E02B 2201/00* (2013.01)

(58) Field of Classification Search
CPC .................................. E02D 29/02; E02B 3/06
USPC .......................................... 405/262, 284–287
See application file for complete search history.

(56) References Cited

U.S. PATENT DOCUMENTS

| | | | | |
|---|---|---|---|---|
| 2,576,530 | A | 11/1951 | Medal | |
| 5,536,111 | A * | 7/1996 | Doernemann | ............ E02B 3/06 405/21 |
| 9,638,732 | B2 | 5/2017 | Weinl | |
| 2009/0188180 | A1 | 7/2009 | Irvine et al. | |

(Continued)

FOREIGN PATENT DOCUMENTS

| | | |
|---|---|---|
| WO | WO2026050489 | 3/2026 |

OTHER PUBLICATIONS

Living seawalls bring back diversity, 2 pages (Year: 2021).*

(Continued)

*Primary Examiner* — Sunil Singh
(74) *Attorney, Agent, or Firm* — MALLOY & MALLOY, P.L.

(57) ABSTRACT

A panel for a seawall has a frame. The frame has a first area and forms front surface which is substantially planar. A typographical member disposed on the frame has a second area, less than the first area. The typographical portion extends in a direction away from the frame and forms an uneven surface, the surface having at least one depression therein having a depth of at least three inches.

1 Claim, 4 Drawing Sheets

(56) References Cited

U.S. PATENT DOCUMENTS

| | | | |
|---|---|---|---|
| 2010/0018146 | A1 | 1/2010 | Aube et al. |
| 2019/0127936 | A1 | 5/2019 | Van De Riet |

OTHER PUBLICATIONS 3D printed concrete wall by Gosselin et al. (Year: 2016).*
3D printed habitat panels (Year: 2020).*
'3D-printed seawalls may be coming soon to a beach near you, thanks to this Miami startup' (Kaminer), Apr. 4, 2022 (Apr. 4, 2022), [online], retrieved from <URL:https://refreshmiami.com/news/3d-printed-seawalls-may-be-coming-soon-to-a-beach-near-you-thanks-to-this-miami-startup/.
'Volvo develops 3D-printed 'living seawall' to save the world's oceans from plastic pollution' (Angelopoulou), Jan. 25, 2019 (Jan. 25, 2019), [online], retrieved from <URL:https://www.designboom.com/design/volvo-3d-printed-living-seawall-ocean-plastic-pollution-01-25-2019.

* cited by examiner

STRUCTURED SEAWALL FOR PROMOTING BIODIVERSITY THEREON

CROSS REFERENCE TO RELATED APPLICATIONS

This application claims the benefit of U.S. Provisional Application No. 63/356,648 filed on Jun. 29, 2022 and U.S. Provisional Application No. 63/403,960 filed on Sep. 6, 2022. The entire contents of these applications are incorporated herein by reference in their entirety.

BACKGROUND OF THE INVENTION

The present invention is directed to a seawall and more particularly to a lightweight, ecologically friendly seawall having a water facing structure which promotes biodiversity.

Sea levels are rising. Conventionally this issue has been addressed by improved pumping and drainage, and more recently the adoption of the ancient practice of seawalls. In the centuries, not much has changed in the structure and use of seawalls; other than some use of materials. Many of these materials and structures are ill suited for seawall use, particularly where a goal is to promote biodiversity. Some prior art walls destroy marine habitats. See for example. U.S. Pat. No. 9,638,732.

While these seawalls were satisfactory, they often result in the destruction of marine habitats and require extensive environmental mitigation measures in coastal regions. This destruction is primarily attributed to two reasons:

1. Leaching of Traditional Concrete: Traditional concrete mixes used in seawall construction tend to leach harmful substances into the water, negatively impacting marine ecosystems.

2. Lack of Attachment Surfaces: The flat and smooth surface of traditional seawalls does not provide suitable conditions for marine life to attach and thrive.

Previous attempts to enhance the ecological aspects of seawalls focused primarily on material innovations aimed at addressing the leaching issue (reason 1). These innovations typically involve increasing the pH of the materials to attract flora and fauna. However, the physical structure of the seawall (reason 2) has remained largely unaddressed. Consequently, even if a seawall is constructed using more ecologically friendly materials, organisms still struggle to attach to a flat surface.

Moreover, the prior art construction methodology relies on molding, which severely limits its effectiveness. The molding process is time-consuming, cost-ineffective when it involves complex shapes, and lacks scalability or freedom of customization. This inherent restriction hampers the adaptability of seawalls to diverse environments and obstructs the creation of structures tailored to support local flora and fauna. The substantial expenses associated with molding seawall panels to incorporate the essential details required for attracting bio-organisms further compound the issue, rendering molded “living seawalls” cost-prohibitive and not scalable for most coastal communities.

Accordingly, a system which overcome the shortcomings of the prior art is desired.

SUMMARY OF THE INVENTION

A panel for a seawall has a frame. The frame forms a front surface having a first area which is substantially planar. A typographical member disposed on the frame has a second area, less than the first area. The typographical member extends in a direction away from the frame and forms an uneven surface, the surface having at least one discontinuity therein having a depth of at least three inches.

In one embodiment of the invention the at least one depression is a blind hole. The typographical portion having a size and being disposed on the frame, so that the frame extends beyond at least three sides of the typographical portion.

In another embodiment of the invention the frame and the typographical portion are formed as a unitary structure. The frame is hollow. A corrugated structure is disposed within the frame across the width of the frame and along the length of the frame within the hollow portion.

In another embodiment of the invention sensors for measuring water quality among other things are disposed in the panel.

In a further embodiment of the invention, the panel has a thickness. The thickness of the frame being about twice the thickness of the typographical portion.

In another embodiment of the invention the panel is formed by 3D printing.

BRIEF DESCRIPTION OF THE DRAWINGS

The features and advantages of the present invention will become more readily apparent from the following detailed description of the invention in which like elements are labeled similarly and in which.

DETAILED DESCRIPTION OF THE PREFERRED EMBODIMENTS

Figure 1:
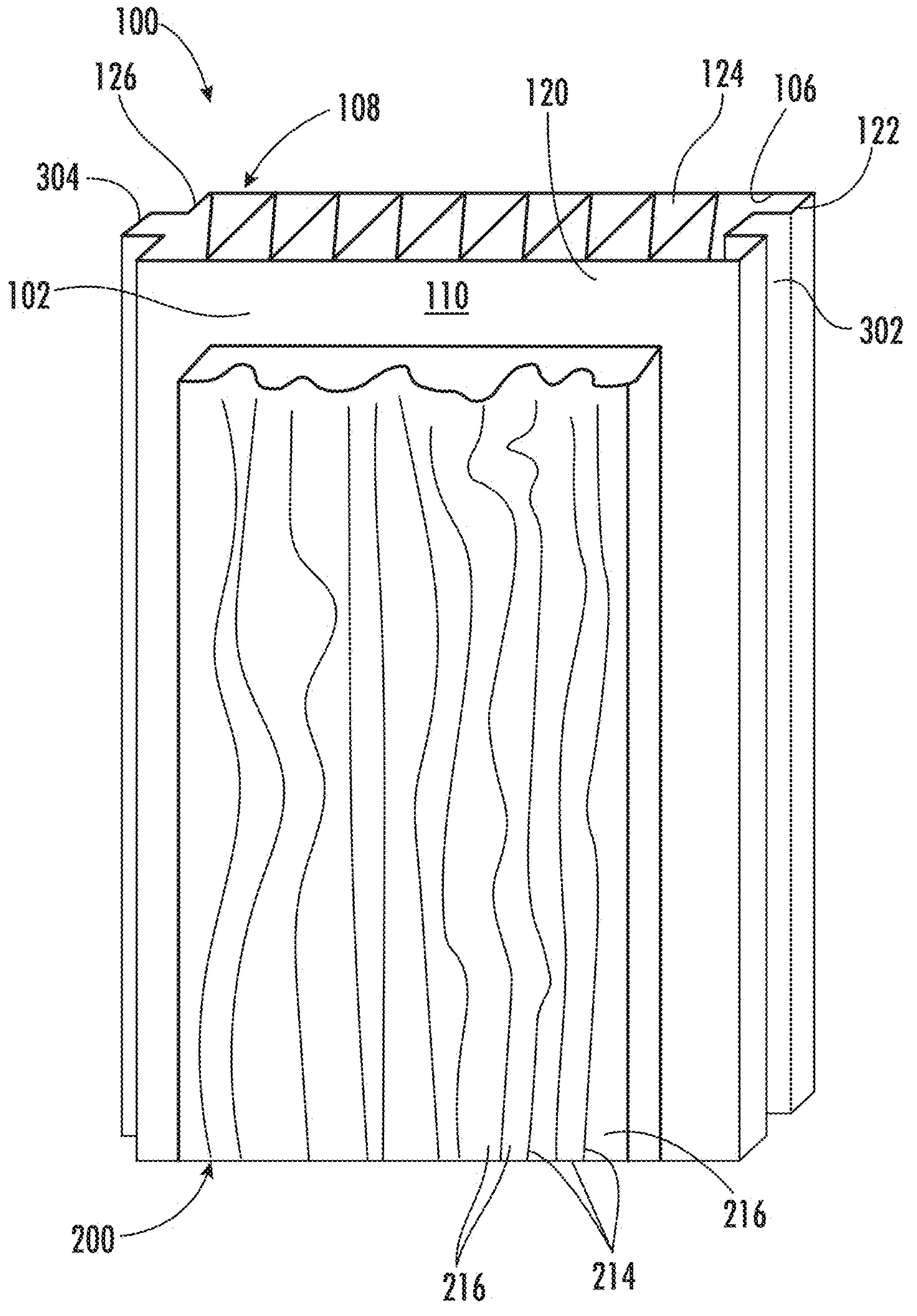
FIG. 1 is a top perspective sectional view taken along line 1-1 of FIG. 2 of a panel constructed in accordance with the invention.
Figure 2:
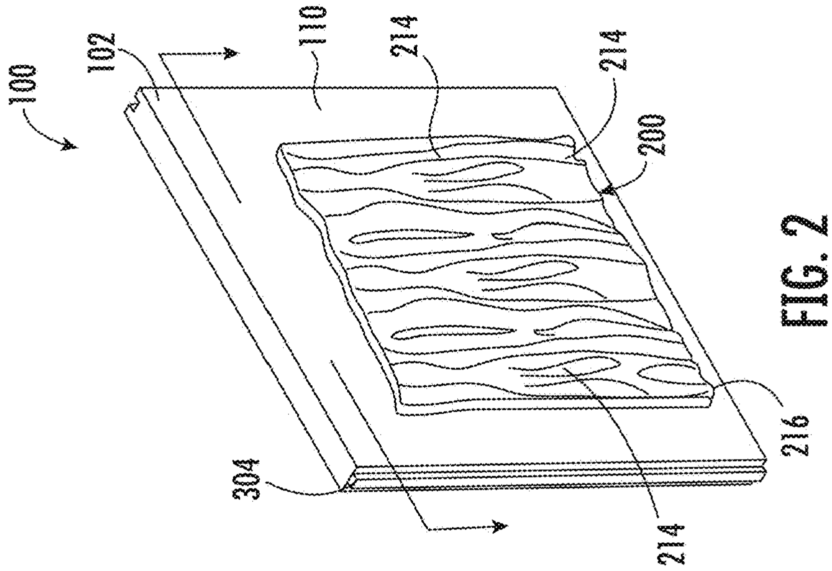
FIG. 2 is a top perspective view of a panel constructed in accordance with the invention.

Reference is now made to FIGS. 1 and 2 in which a panel for a seawall, generally indicated as 100, constructed in accordance with the invention is provided. Panel 100 has a front wall 120 coupled to a rear wall 124 by respective spaced side walls 122 and 126. Front wall 120 forms a frame 102 having a first area. A front surface 110 of wall 120 of frame 102 is substantially planar to form a substantially flat surface. The planar frame 102 allows for traditional installation methods, so that contractors who use the living seawall panels of the present invention can install them in the identical way that they install traditional, flat seawall panels A typographical member, generally indicated as 200, is a three dimensional printed structure, disposed on frame 102 and has an area less than the first area; the area of frame 102. Typographical member 200 has a non-planar, substantially uneven surface. In the exemplary embodiment the non-planar surface faces away from frame 102 and is formed of a plurality of lands 216 separated by at least one, but preferably more than two, discontinuities; here valley(s) 214. At least one valley 214 is at least three inches deep.

Preferably non planer surface is formed of two or more non planer surfaces of different heights separated by at least one discontinuity 214 in the surface.

By providing an uneven surface to typographical member 200, the surface 200 mimics natural formations, such as, coral reefs providing surfaces for flora and fauna to latch onto and grow. By having discontinuities (valleys, depressions) 214 of at least three inches, sufficient depth is provided for animals to hide from predators, just as they would in nature on a coral reef or on a cliff, or even rock face.

As seen from the sectional view of FIG. 1, panel 100 has a substantially hollow interior 106 making it lightweight, easily transportable and maneuverable on site. To provide sufficient structural integrity to panel 100 an internal corrugated member 108 is disposed within the cavity formed by hollow interior 106 bracing the front, sea facing wall 120 of panel 100 against rear wall 124. This structure provides a lighter panel than prior art seawalls without sacrificing structural integrity. Additionally, the planar frame as described above, allows for traditional installation methods, so that contractors who use the living seawall panels can install them in the identical way that they install traditional, flat seawall panels.

It should be noted that in a preferred embodiment panel 100 has a height, a width and a thickness. In a preferred non-limiting embodiment as seen the figures, typographical member 200 has thickness of about one half of a thickness of frame 102. Furthermore the height of typographical member 200 is less than the height of frame 102 sufficient to form a planar surface of front wall 110 and facilitate assembly of a sea wall as will be discussed below. The width of typographical member 200 may be coextensive with, but preferably less than the width of frame 102 to facilitate handling of each panel 100 during transport and assembly. Preferably frame 102 has a thickness of about eight inches, a height of about eight to sixteen inches, and a width of eight to twelve inches. At the same time typographical member 200 has a thickness of about four inches and a width of six to twelve inches and a height less than the height of frame 102.

An individual seawall panel 100 would be overly cumbersome to maneuver and provide in place if a single panel 100 were relied upon to protect an entire area. Panels 100 are used in side by side construction to provide sufficient length for a sea wall 800. Therefore in a preferred non limiting embodiment, an exterior surface of sidewall 126 is formed with a tongue 304. Sidewall 122 is provided with a groove 302. Groove 302 is dimensioned to receive a tongue 304 of an adjacent panel 100 to anchor each other and to form a seawall as will be discussed below.

Figure 4:
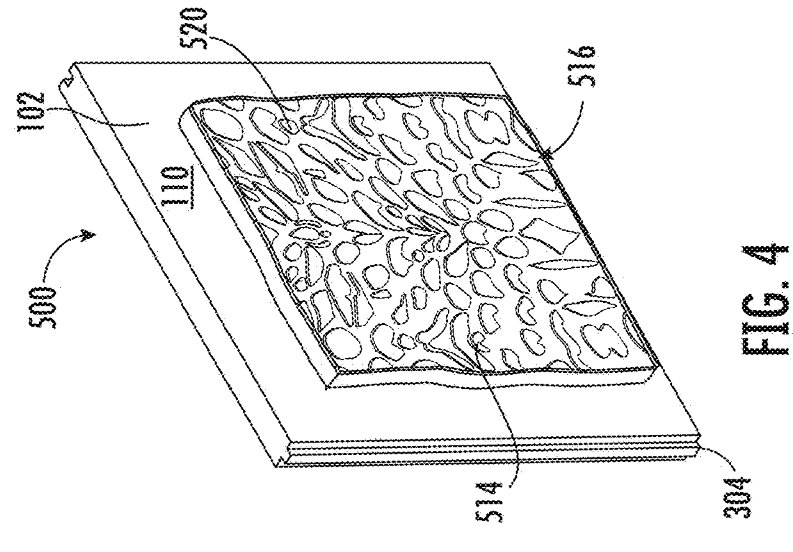
FIG. 4 is a top perspective view of a panel constructed in accordance with a third embodiment of the invention.
Figure 3:
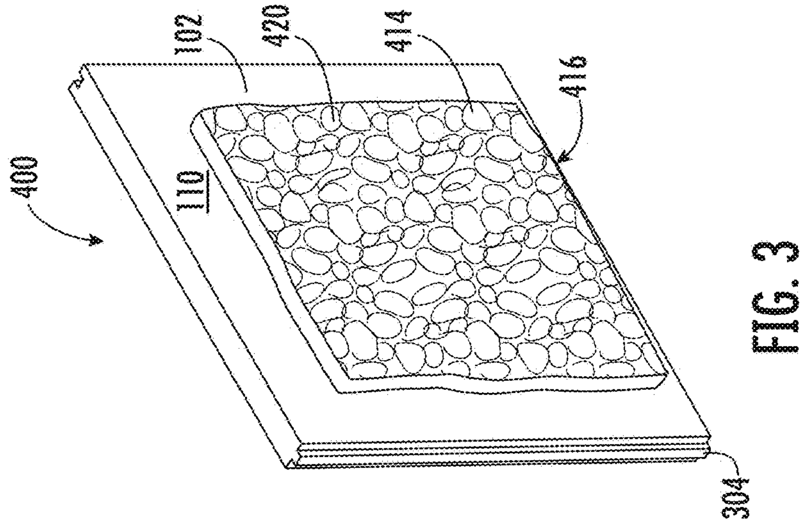
FIG. 3 is a top perspective view of a panel constructed in accordance with a second embodiment of the invention.

As seen from FIGS. 3 and 4 typographical member 200 may take many forms so long as it sufficiently non planer, has an area less than frame 102 and has at least one discontinuity or recess at least three inches deep. For example in a second non limiting embodiment of the invention, in which like structure is indicated by like numerals a panel 400 includes a frame 102 and a typographical member 420 disposed thereon. Typographical member 420 has an area less than frame 102 and includes a number of projections 416, emulating rocks, separated by discontinuities 414 expressed as recesses, at least one of which is at least three inches deep. Panel 400 forms a frame 102 and has a tongue 304 extending down a side of frame 102.

Similarly as seen in FIG. 4, in a third non limiting preferred embodiment of the invention, in which like structure is indicated by like numerals, a panel 500 includes frame 102 and a typographical member 516 disposed thereon. Typographical member 516 has an area less than panel 102 and includes a number of projections 520, emulating the growth of a coral reef, separated by discontinuities 514, expressed as recesses, forming blind holes of various sizes, at least one of which is at least three inches deep. Panel 500 forms a frame 102 and has a tongue 304 extending down a side of frame 102.

In the above embodiments of the present invention, the panels are designed with a unique feature to enhance the attachment and survival of marine life. This feature involves the incorporation of blind holes, which are depressions within the typographical portion of the panel with a minimum depth of 3 inches. These blind holes serve a crucial purpose by providing a safe haven for small marine organisms, allowing them to hide from potential predators and facilitating their attachment to the panel surface. The typographical portion of the panel, which includes the blind holes, is intentionally sized and positioned on the frame to ensure optimal effectiveness. The frame extends beyond at least three sides of the typographical portion, providing additional support and stability to the overall structure of the panel. This configuration ensures that the blind holes remain intact and functional, even in dynamic marine environments characterized by strong currents, waves, and tides.

Figure 5:
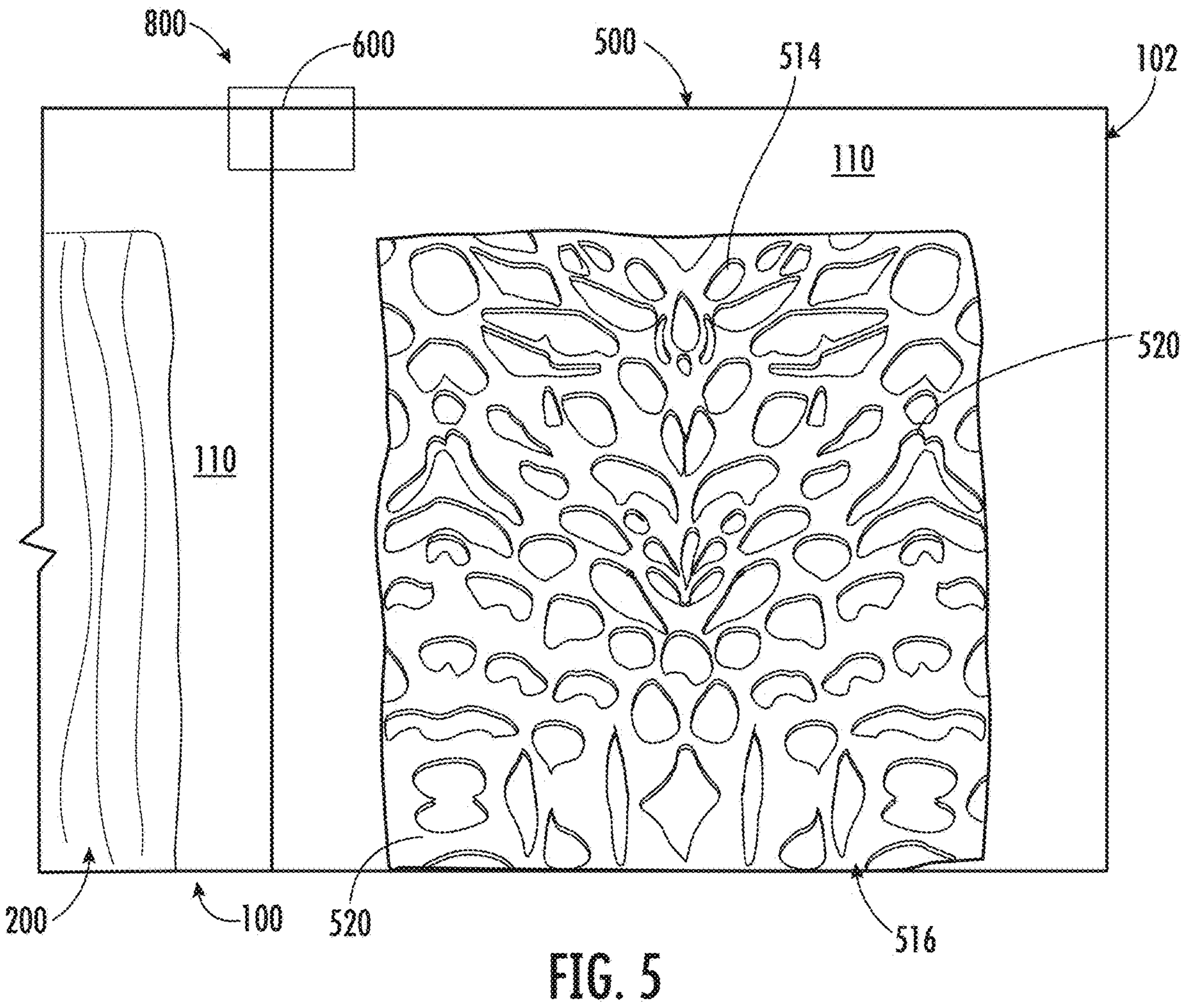
FIG. 5 is a front elevation view showing the construction of a portion of a seawall in accordance with the invention.

Reference is now made to FIG. 5 in which a seawall generally indicated as 800, formed from two or more panels, constructed in accordance with the invention is provided. Seawall 800 includes a first panel 100 adjacent a second panel 500, the tongue of panel 500 (not shown) being received by the groove (not shown) of panel 100. In this way positional integrity is provided. To further secure panel 500 to panel 100 a cap 600 receives both panel 100 and panel 500 across a seam formed where the two abut each other. It should be noted that seawall 800 can be formed solely of a single type of panel 100, 400 or 500, or mixed and matched as shown in FIG. 5. solely as a function of aesthetics or the needs of the environment.

In a preferred non limiting embodiment panel 100 is formed of reinforced concrete. Preferably, the concrete used in creating the seawall is reinforced without the use of rebar or other conventional means removing the need for heavier construction materials such as rebar. Because there is no need for rebar or other reinforcing structure, and because of the viscosity of the cement mixture, the construction of the panel lends itself to 3D printing.

The panel is built in the vertical direction (preferably along the height; top to bottom, but is capable of printing back to front), enabling the construction of the hollow/corrugated interior, extremely difficult if not impossible using conventional concrete mold technologies, as currently used with seawalls. Additionally, frame 110 and typographical member 200 are formed as a unitary member. An alternative embodiment may feature a unitary structure, wherein the frame and the typographical portion are seamlessly integrated. The frame itself is hollow, accommodating a corrugated structure within the panel. The corrugated pattern inside the hollow, 3D printed seawall panels serves as a structural reinforcement that minimizes the need for traditional rebar. As with frame 110 and typographical member 200, frame 110 and corrugated pattern 108 are formed as a unitary member.

By incorporating a series of alternating ridges and valleys, the corrugated pattern enhances the panel's strength and integrity. The ridges provide additional material and surface area, distributing forces and load-bearing capacity more effectively throughout the panel. The corrugated pattern increases the panel's resistance to bending and flexing forces. It adds rigidity and stiffness to the structure, allowing it to withstand external pressures, such as wave impact and hydrostatic forces, more effectively. The distributed stress across the corrugated surface helps prevent cracks and failure, enhancing the longevity and durability of the seawall. Moreover, the use of 3D printing technology enables the precise fabrication of the corrugated pattern within the hollow section of the panel. This level of precision ensures consistent and uniform reinforcement throughout the entire structure. As a result, the 3D printed seawall panels achieve enhanced strength, stability, and resilience, reducing the reliance on traditional rebar reinforcement methods, while reducing overall weight.

In another embodiment of the present invention, the seawall panels are characterized by a specific thickness, carefully designed to achieve structural robustness and long-term stability, while incorporating sufficient surface are and complexity to encourage sea life attachment. The panel construction consists of two distinct sections: the solid frame and the typographical portion. The solid frame of the panel is engineered to be approximately twice as thick as the typographical portion. This deliberate configuration enhances the overall strength and durability of the seawall, ensuring its ability to withstand the forces exerted by waves, currents, and other environmental factors over an extended period. By providing a sturdy foundation, the thick frame contributes to the structural integrity and longevity of the seawall, promoting its effectiveness as a coastal protection solution. Within the panel, the front surface facing the water incorporates the irregular ecological pattern, designed to encourage the attachment and growth of marine organisms. This pattern extends to a depth of 1-4 inches, forming an intricate surface that offers varied textures and discontinuities.

Additionally, these irregularities, coupled with the blind holes discussed earlier, create an environment conducive to marine life attachment and habitat formation. By encouraging the presence of marine organisms, they shield the wall from direct contact with the water, reducing the impact of waves and currents. The organisms act as a natural buffer, absorbing and dissipating the energy of the water, which helps to mitigate erosion and damage to the seawall. The biofouling layer can contribute to the overall durability of the seawall. The organisms secrete substances, such as mucus or adhesives, which help bind them to the surface and create a cohesive layer. This layer can enhance the seawall's resistance to abrasion, erosion, and other environmental stresses. Additionally, some marine organisms produce compounds that possess antifouling or anti-corrosive properties. These compounds can inhibit the growth of other organisms or protect against the degradation of the seawall materials by preventing the formation of biofilms or reducing the impact of chemical processes.

Importantly, it should be noted that the entire panel, with its 12-inch thickness, is printed as a single entity using advanced 3D printing technology. This manufacturing approach ensures the seamless integration of the frame and the typographical portion, eliminating the need for separate assembly or attachment. By printing the entire panel as a unified structure, the resulting seawall exhibits enhanced strength and integrity, without any weak points or joints that may compromise its overall performance.

Figure 6:
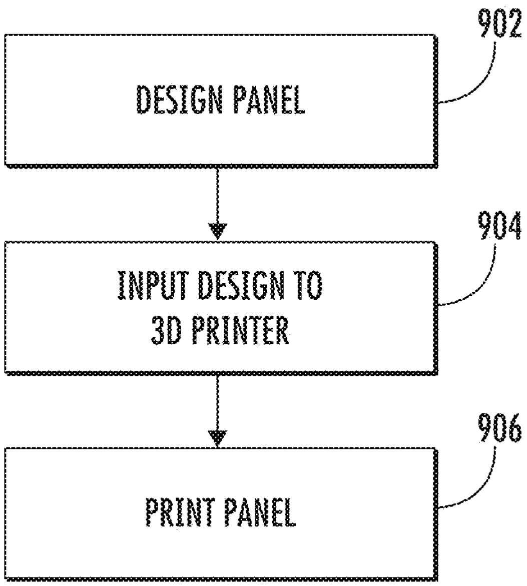
FIG. 6 is a flowchart of a method of manufacture in accordance with the invention.

Reference is now made to FIG. 6 in which a method for manufacturing a seawall in accordance with the invention is provided. In a first step 902 the panel is designed to promote bio diversity and prevent flooding taking into account local micro environment and the design conforming to the following design rules: 1.) the frame is about twice as thick as the typographical member; 2.) The typographical member is substantially not planer and includes discontinuities in an outward facing surface of the typographical member, and 3.) at least one discontinuity has a depth of at least three inches.

The design is uploaded to a 3D printer in a step 904. The 3D printer prints the design in a vertical direction with cement in a step 906.

It should be noted that during the printing process the internal corrugated structure 108 is formed simultaneously with the sidewalls as a result of the nature of the printing process. There is no need to separately manufacture the components for later assembly. It is all done at once.

It should also be noted that during manufacture, sensors for monitoring or measuring the environment may be embedded in either one of the frame or typographical member. Sensors capable of measuring water quality and other relevant parameters can be incorporated within its structure. This integration enables continuous monitoring and analysis, providing valuable data for environmental assessment and management. The sensor is attached to the panel, 1 foot above the seabed, allowing water to flow through the sensor and enabling the sensor to be easily hoisted up and calibrated. As can be seen a seawall constructed in accordance with the invention may be formed to adapt to variety of environments to attract varied sea life, and provide shelter for animals to evade predators. because of the materials used, each panel is free from toxins.

By prompting attachment of flora and fauna, the wall itself absorbs $CO_2$ from the environment. Additionally by providing a habitat to marine organisms, when skeletons are left behind, the skeletons assimilate carbon. Artificial reefs strengthen over time because of a process (science) called "marine biofouling", where marine organisms such as corals, oysters, mussels, barnacles, and certain types of algae attach themselves to the structure. These organisms reinforce the structure of the reef, making it more robust. Coral growth on an artificial reef can cement the structure together, making it more resistant to wave action and currents. As these organisms attach to the present seawall, due to the unique design of our structures that will attract life, they will also strengthen the seawall over time through the process of marine biofouling. Because of the 3D printing process used to manufacture the panels, all of the materials emanating from the printer becomes part of the wall; effectively eliminating waste.

By creating the reef and deploying in situ, biocalcification occurs. Biocalcification is a natural process by which marine organisms, such as corals and shell-forming creatures like oysters, extract calcium carbonate (CaCO3) from the surrounding water to build their skeletons or shells. This process involves the uptake of dissolved inorganic carbon (DIC) from the water, which consists of carbon dioxide (CO2) and bicarbonate ions (HCO3−), and the conversion of this carbon into solid calcium carbonate structures. In the context of our living seawalls, the biocalcification process occurs when marine organisms, attracted to the panels, attach and grow on their surfaces. As these organisms grow, they secrete calcium carbonate, which gradually accumulates and reinforces the structure of the seawall. Over time, as more organisms settle on the panels and deposit their skeletons, the seawall becomes increasingly robust and durable. The biocalcification process also offers a significant environmental benefit by sequestering carbon dioxide from the water and converting it into solid calcium carbonate. This sequestration helps mitigate the effects of carbon emissions on the environment by removing $CO_2$ from the water column and locking it away in the form of the skeletons deposited on the seawall. This process effectively reduces the carbon dioxide concentration in the surrounding water, contributing to the overall carbon sequestration capacity of the living seawalls. As a result the seawall constructed in accordance with the invention not only provide structural protection against flooding and wave impacts but also serve as a means to actively sequester carbon from the marine environment. This dual-functionality promotes the growth of healthy marine ecosystems while mitigating the effects of climate change, making the seawalls an environmentally beneficial solution for coastal communities.

In another embodiment of the present invention, the seawall panels feature strategically incorporated "lifting eyes" positioned at the corners of the panels. These lifting eyes serve as anchor points within the panel structure, enabling the seamless lifting and transportation of the panels throughout various stages of the manufacturing and installation process. During production, the lifting eyes facilitate the transfer of the panels from the production floor to the curing area, streamlining the workflow and ensuring efficient handling. Subsequently, when the cured panels are ready for delivery, the lifting eyes enable secure placement onto delivery truck beds, minimizing the risk of damage or displacement during transportation. Furthermore, the lifting eyes play a crucial role during the installation phase, as they can be utilized by specialized equipment to safely and precisely lower the seawall panels into the water at the designated construction site. By incorporating these lifting eyes into the panel design, the invention enhances overall logistics and operational efficiency, simplifying the handling and installation process of the seawall panels.

A notable and innovative aspect of the present invention lies in its utilization of advanced 3D printing technology for the manufacturing process of the seawall panels. This additive manufacturing method revolutionizes the production of the panels by offering numerous advantages in terms of efficiency, precision, scalability, and customization. The use of 3D printing, also known as additive manufacturing, enables the creation of the seawall panels with a high degree of accuracy and consistency. This technology utilizes layer-by-layer deposition of materials based on digital designs, allowing for precise control over the fabrication process. As a result, each panel can be produced with exceptional precision, ensuring uniformity in dimensions, shape, and structural characteristics. One of the key benefits of 3D printing in this context is its inherent scalability. The additive manufacturing process enables the efficient production of panels in varying sizes and quantities, accommodating the diverse needs and demands of different coastal environments. This scalability is particularly advantageous for large-scale seawall projects where a significant number of panels are required. Furthermore, 3D printing facilitates customization and adaptability in panel design. The technology allows for the creation of intricate details, complex geometries, and specific features within the panels. This level of design flexibility empowers the customization of panel structures to suit specific marine environments, promoting the attachment of diverse flora and fauna and enhancing biodiversity. With 3D printing, the panels can be tailored to meet the unique requirements of different coastal regions, optimizing their ecological impact and effectiveness. The utilization of advanced 3D printing technology in the manufacturing process of the seawall panels represents a significant advancement in the field. It not only improves the efficiency and precision of production but also enables customization and adaptability, unlocking new possibilities for sustainable coastal protection.

In summary, the present invention introduces a novel panel design for seawalls, offering improved structural features, enhanced biodiversity promotion, and efficient manufacturing processes. Through the integration of innovative elements, such as the typographical member, hollow frame, corrugated structure, sensors, and 3D printing technology, the panel demonstrates the potential to revolutionize seawall construction and its ecological impact.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A panel for a seawall comprising:

a frame having a first area and forming a front surface, the front surface being substantially planar the frame comprising:

a front wall;

a back wall spaced from the front wall;

a first side wall disposed between the front wall and the back wall; and a second side wall spaced from the first side wall, the second side wall being disposed between the front wall and the back wall, wherein the front wall, the back wall, the first side wall, and the second side wall form a cavity within the frame, wherein the first side wall is formed with a groove therein, wherein the second side wall is formed with a tongue extending therefrom, and wherein an internal corrugated member is disposed within the cavity to brace the front wall against the back wall; and a typographical member on the front surface of the frame having a second area, less than the first area; the typographical member extending outwardly from the front surface of the frame and forming an uneven outer surface, the uneven outer surface having a plurality of discontinuities therein, the plurality of discontinuities comprising at least one valley and at least one blind hole, wherein at least one discontinuity of the plurality of discontinuities has a depth of at least three inches, wherein the frame extends beyond at least three sides of the typographical member to define a substantially planar border around the typographical member, wherein the typographical member and the frame are formed together as a unitary concrete body, and wherein the panel further comprises a sensor for monitoring an environment adjacent the panel, the sensor being embedded in the typographical member.

* * * * *